UNITED STATES PATENT OFFICE.

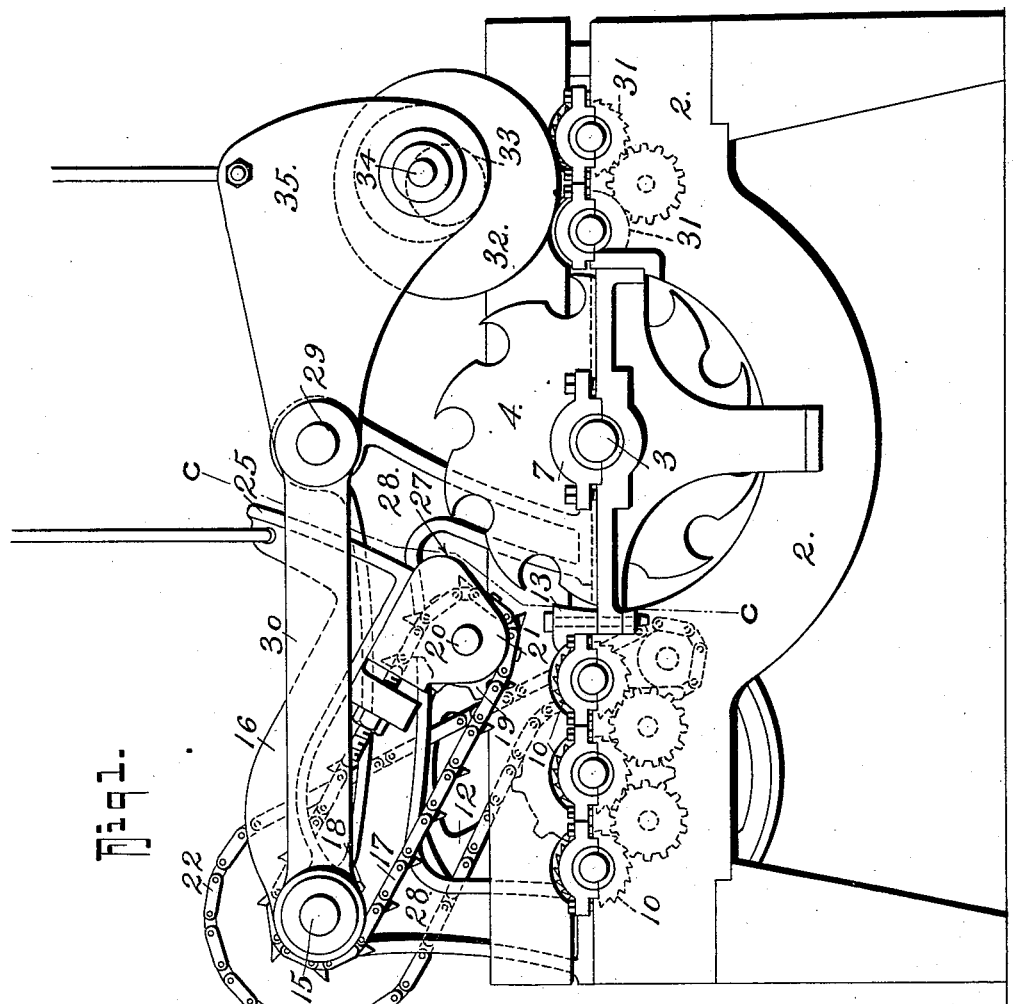

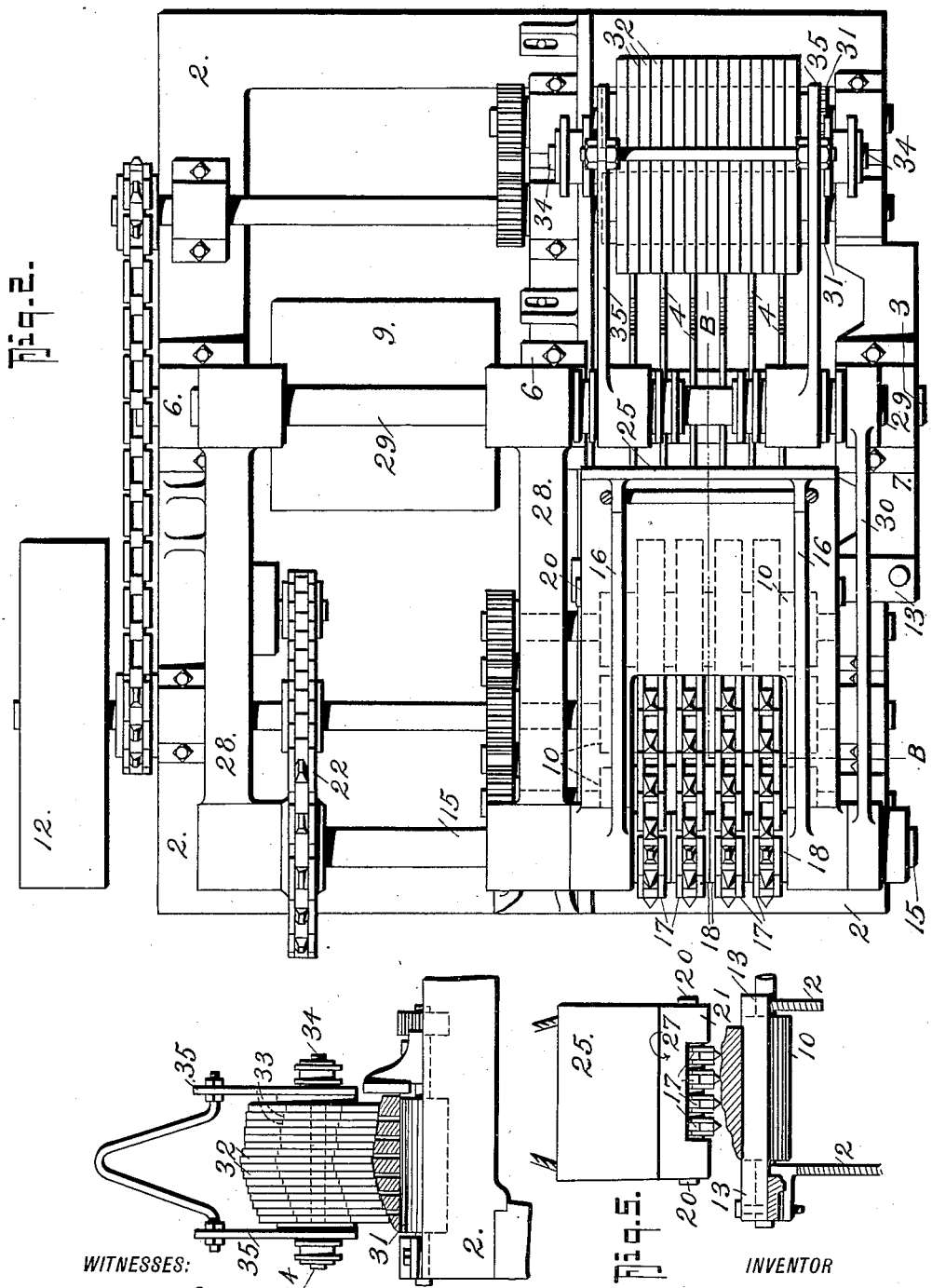

MAHLON L. PETERMAN, OF MILLSIDE, BRITISH COLUMBIA, CANADA.

LATH-BOLTER.

1,077,551.      Specification of Letters Patent.      Patented Nov. 4, 1913.

Application filed February 10, 1910. Serial No. 543,158.

*To all whom it may concern:*

Be it known that I, MAHLON L. PETERMAN, a citizen of the United States of America, residing at Millside, in the Province of British Columbia, Canada, have invented a new and useful Lath-Bolter, of which the following is a specification.

This invention relates to a machine for cutting lath bolts from slab wood from which bolts the laths are later cut in a stripper the thickness of the bolt being thus necessarily the width of the lath.

In cutting lath bolts from slab wood difficulty is experienced owing to the rough character of the wood and its irregular thickness and the machine which is the subject of this application has been devised to overcome these difficulties and enable the work to be expeditiously and safely performed.

The machine comprises a gang of circular saws spaced apart on their spindle to cut the required thickness of bolt, and in means for strongly feeding a slab to these saws.

It also comprises provision to prevent the slab wood being thrown back when a hard knot is encountered and in the means by which the cut bolts of irregular thickness are separately held upon the feed rollers by which they are drawn from between the saws.

The means by which these several results are attained is fully set forth in the following specification, reference being made to the drawings by which they are accompanied, in which:

Figure 1 is a side elevation of the machine, Fig. 2, a plan of the same, Fig. 3, is a detail end elevation of a part of the rear end of my machine. Fig. 4, is a detail section substantially on the line B B of Fig. 2. Fig. 5, is a detail section substantially on the line C—C of Fig. 1.

In these drawings 2 represents the frame of the machine which is supported at a convenient height from the floor for attendance and 3 is the shaft on which the splitting saws 4 are carried at the required distance apart to cut the desired thickness of bolt. This shaft 3 is rotatable in two fixed bearings 6 on the frame of the machine and a removable bearing 7 in the front to facilitate the removal of the saws for renewal or change.

The saw shaft 3 is driven by a belt over a pulley 9 situated between the two fixed bearings 6. In front of the saws 4 and rotatable in bearings in the frame of the machine are feed rolls 10 driven by any suitable mechanism that will rotate them in the desired direction by an independent belt over a pulley 12. The center feed roll is what is known as a saw feed being formed of a series of small diameter circular saws across the width of the roll with distance pieces in between. This feed roll is used as affording a stronger bite on the bolt with a less downward pressure.

Extending across the width of the feed table and between the gang of saws and the nearer feed roller 10 is a support bar 13 the shape of which in cross section conforms closely to the path of the saw teeth on one side and to that of the feed roller on the other and which is brought up to the approximate level of the tops of the rollers. This support 13 is designed to fill the interspace between the saws and the roller adjacent and support the slab close up to the cut of the saws.

Pivotally mounted on a shaft 15 over the feed rolls and having its free end depending downward to a position approximately over the support bar 13 is a swinging frame 16 carrying across the width of the moving table of rollers a series of spike sprocket chains 17 passing over small sprocket wheels 18 keyed to the shaft 15 and over others 19 secured on the shaft 20 rotatable in bearings 21 on the free end of the swinging frame 16. These chains not only hold the slab well down on the moving table beneath but assist in feeding it strongly to the saws.

The shaft 15 is driven by a sprocket chain 22 from the shaft below which drives the feed rollers.

The front cross bar 25 of the swinging frame 16 is carried upward across the width of the saws and forms a guard to prevent a cut bolt from being backwardly thrown beyond it and with a similar object in view the bar 26 which connects the bearings 21 is carried downward as at 27 as close as practicable between the spikes of the chain 17 and the saws 4 to prevent the after end of a bolt from being carried up by the spikes of the chain.

The shaft 15 is carried in a frame 28 secured to the frame of the machine which carries the fixed bearings 6 which frame also carries a shaft 29 immediately over the saw arbor 3 and the overhung end of 15 is tied to the overhung end of 29 by a link rod 30.

On the leaving end of the machine are feed rollers 31 driven in any suitable manner from the driving shaft of the entering feed rolls and from one another one of which feed rolls, that farther from the saws, may advantageously be constructed as a saw feed. The cut lath bolts are separately held down on these leaving feed rolls 31 by metal disks 32 having large sized apertures 33 where they are freely mounted on a shaft 34 carried on a swinging frame 35 which frame is mounted on the shaft 29. These disks are arranged close together but are freely slidable in relation to one another so that by their own weight they may fall to follow the irregular contour of the upper sides of the bolts and will securely hold them down on the feed rolls. The swinging frame 35 which carries these disks has provision by which it may be counterweighted and a similar provision is furnished to the swinging frame 16 which carries the feed chains at the entering end of the machine.

A strong and serviceable machine is thus constructed which is particularly adapted to the work for which it was designed, the cutting of lath bolts from slab wood which work is rough and severe on a machine of this class owing to the irregular thickness of the slab both lengthwise and across the width, and to the frequency of knots of large size which are severe on the saws and break up the continuity of the laths.

The removable front bearing of the saw arbor enables a change of saws to be rapidly effected and the strong top and bottom feed of the front end with the provision of the support bar 13 and the guards 25 and 27 of the swinging chain feed prevent broken pieces from being thrown back or into the feed chains and at the leaving end the independently movable disks adapt themselves to the varying depths of the cut bolts and enable those bolts to be safely carried from the machine by holding them tightly down on the feed rolls.

Having now particularly described my invention and the manner of its construction, I hereby declare that what I claim as new and desire to be protected in by Letters Patent, is:

1. In a machine of the character stated, a main frame, a gang of circular saws rotatably mounted on a common axis in said main frame, a lower feed mechanism, a supplemental frame mounted on said main frame, a driving shaft mounted on said supplemental frame, a feed chain carrying frame pivoted on said drive shaft, a set of sprockets on said drive shaft, a sprocket carrying shaft mounted in the front end of said pivoted frame, endless feeding sprocket chains passing over said sprockets, a support bar extending across in front of said gang of saws between said gang of saws and said lower feed mechanism, the contact of said feeding sprocket chains being directly over said support bar, a second frame pivoted to said supplemental frame, and rollers carried by said second pivoted frame coöperating with the delivery end of the lower feed mechanism to hold the split boards on said lower feed mechanism at the delivery end.

2. In a machine of the class described, a main frame having bearings, a shaft mounted in said bearings, a gang of saws carried by said shaft and spaced apart, feeding rollers in advance of said saws, a supplemental frame supported on said main frame, a driving shaft mounted in bearings in said supplemental frame, a feed chain carrying frame pivoted on said driving shaft, a gang of feeding sprocket chains one for alining with each space between an adjacent pair of saws, a second frame pivotally mounted on said supplemental frame and a plurality of yieldable presser rollers carried by said second supplemental frame and held over said delivery rollers to retain the sawed boards in contact with said delivery rolls.

3. In a machine of the character stated, a main frame, a gang of circular saws rotatably mounted on a common axis in said main frame, a lower feed mechanism for feeding the boards to the saws, a bearing carrying member mounted on said main frame, a driving shaft mounted in said bearing carrying member, a feed chain carrying frame pivoted on said driving shaft, a plurality of sprockets on said driving shaft, bearing members mounted on said feed chain carrying frame adjacent to its free end, a plate connecting said bearing members together, adjusting devices at each side of said chain carrying frame to adjust the bearing members at the corresponding sides, a sprocket carrying shaft having its ends mounted in said bearing members, endless feeding sprocket chains passing over said sprockets, means for driving said driving shaft, and means for turning said saws.

4. In a machine of the character stated, a main frame, a gang of circular saws rotatably mounted on a common axis in said main frame, a lower feed mechanism for feeding the boards to the saws, a bearing carrying member mounted on said main frame, a driving shaft mounted in said bearing carrying member, a feed chain carrying frame pivoted on said driving shaft, a plurality of sprockets on said driving shaft, bearing members mounted on said feed chain carrying frame adjacent to its free end, a plate connecting said bearing members together, adjusting devices at each side of said chain carrying frame to adjust the bearing members at the corresponding sides, a sprocket carrying shaft having its ends mounted in said bearing members, endless feeding sprocket chains passing over said sprockets, means for driving said driving shaft, and means for turning said saws, said bar which connects said bearing members having its front edge turned over downwardly to form a guard between said saws and said chains.

5. In a machine of the class described a gang of circular saws, a lower feeding mechanism at the entrant end of said machine, a lower delivering mechanism at the exit end of the machine, an upper feeding mechanism for holding the boards on the lower feeding mechanism and assisting in feeding them to the saws, said upper feeding mechanism including a plurality of feeding chains, one for each space between adjacent saws, and means for applying a yielding pressure separately to each bolt to hold them down on the lower delivery mechanism, said last named means including a plurality of yieldable rollers for each space between adjacent saws, substantially as specified.

6. In a machine of the class described, a gang of circular saws, means for feeding the material to the saws, lower delivering rollers for conveying the bolts from the saws combined with a yieldably mounted set of presser rollers for retaining the bolts on the delivery means, and including a plurality of disks for each delivery roll.

In testimony whereof I have signed my name to this specification in the presence of two subscribing witnesses.

MAHLON L. PETERMAN.

Witnesses:
MARY PETERMAN,
ROWLAND BRITTAIN.

Copies of this patent may be obtained for five cents each, by addressing the "Commissioner of Patents, Washington, D. C."